UNITED STATES PATENT OFFICE.

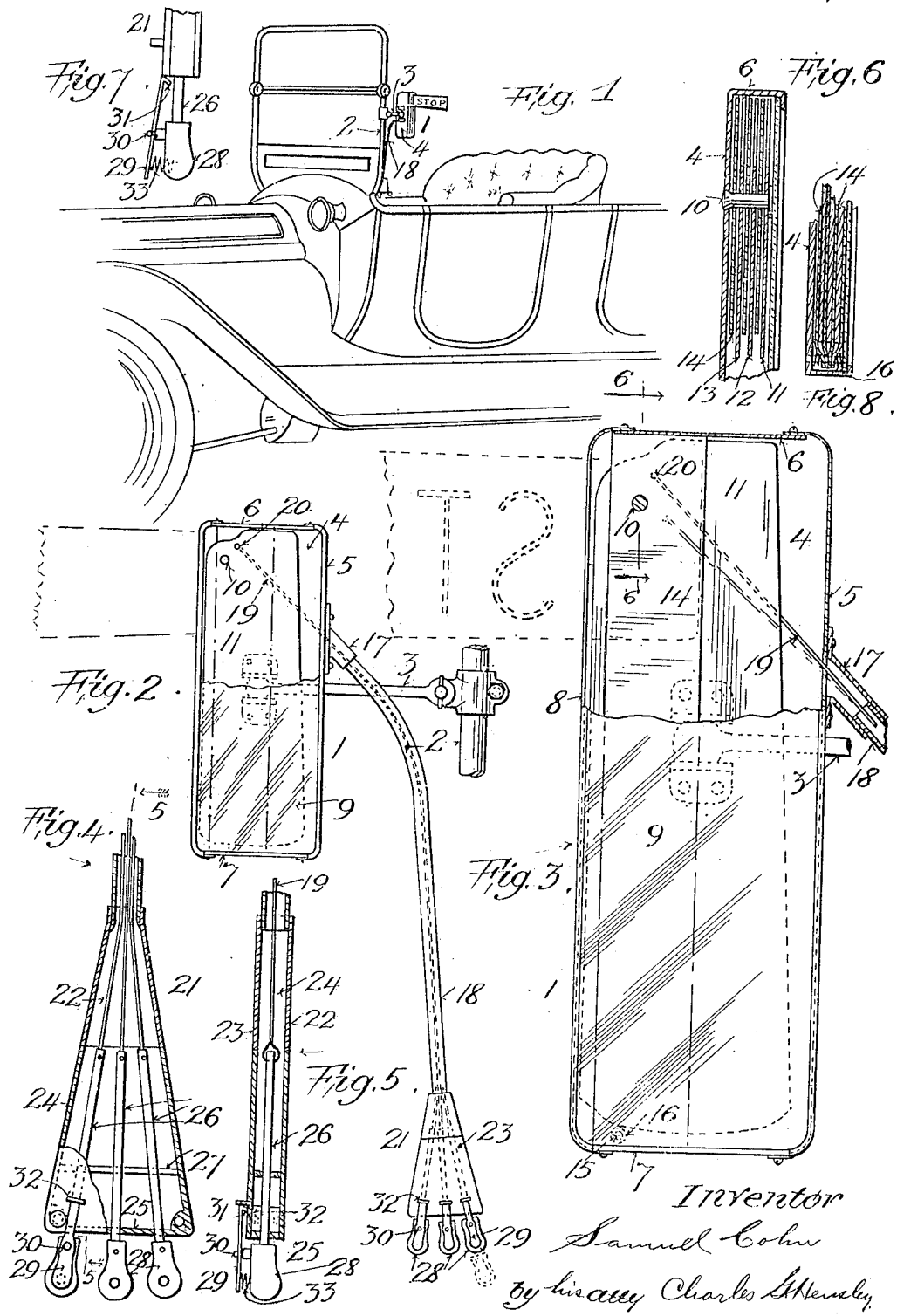

SAMUEL COHN, OF NEW YORK, N. Y., ASSIGNOR TO POLICE TRAFFIC AUTO SIGNAL CO., A CORPORATION OF NEW YORK.

AUTOMOBILE-SIGNAL.

1,292,434.   Specification of Letters Patent.   Patented Jan. 28, 1919.

Application filed October 25, 1917. Serial No. 198,439.

*To all whom it may concern:*

Be it known that I, SAMUEL COHN, a citizen of the United States, and a resident of the borough of Bronx, city and State of New York, have invented certain new and useful Improvements in Automobile-Signals, of which the following is a specification.

The present invention relates to signal devices for use on automobiles and other road vehicles. The device is useful as a means for signaling to a traffic officer when an automobile approaches a corner, so that the officer may be informed as to whether the autoist intends to continue straight ahead or to turn to the right or left, in order that he may instruct the autoist as to when and how to proceed. It is also adapted for signaling to vehicles behind, of an intention to stop or to turn to the right or left.

The object of my invention is to provide a very simple, compact and inexpensive device which may be readily attached by any one to any vehicle whether it be of the open or closed type. The device is of the semaphore or movable signal type and the inclosure for the signal plates is not only very compact but the operating mechanism is reduced to the simplest and most convenient form. The invention includes a very simple and effective device for preventing rattling and it is arranged to hold the signal plates. Other features including a very simple and convenient locking and unlocking device will be pointed out in the detailed description hereinafter.

In the drawing forming part of this application,

Figure 1 is a perspective view of an automobile with my invention applied thereto, Fig. 2 is an elevation of my invention, with parts broken away to show the interior, Fig. 3 is an elevation, on a larger scale of the signal plates and their casing, Fig. 4 is a sectional view of the controller box, Fig. 5 is a sectional view taken on the line 5—5 of Fig. 4, Fig. 6 is a sectional view taken on the line 6—6 of Fig. 3, and Fig. 7 is a detail view of one of the locking members.

The casing 1 is adapted to be secured to some part of automobile, for instance, to the wind shield frame 2, by a bracket 3, and the casing 1 is adapted to extend from one side of the automobile where it will be visible from in front as well as in the rear of the automobile.

The casing 1 is here shown as a rectangular closure comprising a front wall 4 end wall 5 a top 6 and a bottom 7 with one end, 8, left open to permit the signal plates to move into and out of the casing. In addition, there is a mirror 9 forming the rear wall of the casing and by means of this mirror the autoist may observe vehicles at the rear.

Attached to the casing is a stud 10 which supports the swinging signal plates, there being three such plates 11, 12, 13 shown in the drawing. These signal plates will have suitable markings, for instance, one may be marked "Stop" and the others "Right" and "Left" respectively.

The signal plates are inclosed in the casing 1 when they are lowered and when raised, as shown in dotted lines in Figs. 2 and 3, they extend at right angles from the top of the casing.

Between adjacent signal plates, and, if desired, between the end one and the casing there are arranged separating plates 14, which are held at the top preferably on the stud 10 on which the signal plates are pivoted. At the bottom there is a fixed pin 15 passing through these plates. There are springs 16 surrounding the pin 15 and arranged between the casing walls and the outer plates 14. The tendency of these springs is to press the lower ends of the plates 14 from opposite sides adjacent each other. As set forth, each signal plate lies between two of these separator plates and when all the signal plates are down or within the casing they are separated from each other by the separating plates, which latter are pressed laterally by the springs 16. When a signal plate is swung on the stud 10 to signaling position only the upper end lies between the separator plates. As the lower end of the signal plate moves out from the separator plates the lower ends of the latter are bent by the action of the springs 16 so that the several separator plates and the lower ends of the remaining signal plates are all pressed against each other to prevent rattling. As a signal plate is swung back into the casing it gradually spreads apart the lower ends of the separator plates on either side, acting against the resistance of the springs 16. The separator plates are pressed together, laterally, by the springs 16 and when one or more signal plates are down the separator plates are pressed against them in order that the signal and separator plates shall not shake sidewise and rattle.

On the casing 1 there is a casting 17 from which there extends a tube 18. The latter is preferably made of metal but sufficiently pliable to allow it to be adjusted to bring the controller box in convenient position. In this tube 18, there are suitable members, such as wires 19 which may take the bend of the tube 18 but which are sufficiently stiff to operate the signal plates by a pushing or pulling action. The upper end of each wire 19 is connected at 20 to one of the signal plates a short distance from the stud. The tube 18 and wires 19 extend diagonally from the casing 1, so that the wires operate directly on the signal plates without intermediate mechanism.

At the free end of the tube 18 there is connected a controller box 21 comprising a rear wall 22 and front wall 23 of fan shape; end walls 24 and the bottom wall 25. The wires 19 lead into the box 21 and each is connected with a slide 26. These latter are guided in apertures in the partition 27 and in similar apertures in the bottom wall 25 so that the slides may move lengthwise of the box 21. Where the slides project beyond the box 21 they are provided with operating handles or knobs 28.

Associated with each knob 28 there is a locking member 29 pivoted to the knob at 30. The locking members each have a projection 31 adapted to enter slots 32 in the box 21 or to rest against the bottom of the box and a spring 33 under each locking member 29 tends to move it into locking position. To throw up a signal plate the autoist grasps one of the knobs 28, presses the free end of the locking member 29 attached to it, and then pulls on the knob to move the corresponding slide 26 downwardly. This will pull down one of the wires 19 and it will cause the corresponding signal plate to be swung out to the position shown in Fig. 1. When the knob has been pulled down, the locking member 29 will be released and its projection 31 will rest against the bottom of the box and prevent the knob and the parts connected with it, from returning; that is, it will hold the signal plate in signaling position and prevent it from dropping down. To return the signal plate the locking member 29 is again pressed, this time to unlock it from the bottom 25 and the knob 28 is pushed upwardly. This will cause the return of the corresponding wire 19 and its signal plate. More than one signal plate may be thrown up at the same time if desired.

Having described my invention, what I claim is:—

1. A signaling device of the class described comprising a casing, pivoted signal plates in said casing and adapted to be projected therefrom, and spring plates arranged between adjacent signal plates and adapted to prevent lateral movement of the free ends of said signal plates, said spring plates being arranged whereby they may engage the signal plates when the latter are projected from or folded within said casing.

2. A signaling device of the class described, comprising a casing, a pivot member, signal plates mounted at one end to swing on said pivot member, and adapted to be projected from said casing, flexible separator plates mounted on said pivot member and extending beyond the opposite ends of said signal plates, a pin for guiding the ends of said separator plates extending beyond the signal plates and springs for pressing the ends of said separator plates toward each other to prevent lateral movement of the signal plates.

3. A signaling device of the class described comprising a casing, signal plates therein and adapted to be projected therefrom, connecting wires or rods for actuating the signal plates, operating knobs or handles for operating said connecting wires or rods and individual locking means for said operating knobs, said locking means being movable with said knobs.

4. A signaling device of the class described comprising a casing, signal plates therein and adapted to be projected therefrom, a tube extending from said casing, actuating members for the signal plates extending through said tube, a controller box on the free end of said tube, actuating members for the signal plates extending through said tube, slides in said controller box for moving said actuating members, knobs or handles for actuating said slides and pivoted locking members movable with said knobs or handles, adapted to lock said slides.

Signed at the city, county, and State of New York, this 8th day of October, 1917.

SAMUEL COHN.